Patented Apr. 7, 1942

2,278,464

UNITED STATES PATENT OFFICE 2,278,464

MEDICINAL PREPARATION

Albert Musher, New York, N. Y., assignor, by mesne assignments, to Food Manufacturing Corporation, Chicago, Ill., a corporation of New York No Drawing. Application September 20, 1938, Serial No. 230,843

4 Claims. (Cl. 167—56)

The present invention relates to the production of medicinal preparations. It particularly relates to the enhancement of laxative preparations which may be derived from or which may include seeds giving rise to a mucilaginous exudation, such as, for instance, psyllium or similar seeds and materials.

Many difficulties have been experienced in the use of psyllium seeds and other seeds for laxative purposes because of their relatively hard hulls and sharp edges. As a result such seeds tend to lodge in the intestinal or digestive tract and cause irritation and intestinal disturbances.

Moreover because of the resistant nature of the hulls of these seeds or because of the compacted condition of the fibres or cells that provide the mucilaginous exudation, there is usually prevented a full development of this exudation which produces the bulk and enables the laxative or peristaltic effect. In fact, at times, these seeds develop only a relatively small part of their possible bulk.

Consequently heretofore it has been necessary to use more seeds to obtain the desired bulk in view of the loss in large part or of the materially retarded action of the desired properties of the seeds.

Furthermore, the seeds in their original condition are quite difficult to ingest and tend to be slippery and are not readily either taken into the mouth nor readily swallowed when mixed with water or other materials. They also tend to get into the crevices between the teeth.

They would give better effect if they could be chewed because then the aqueous materials could get at a larger portion of the seeds, but it is difficult for the teeth to grip them because of the relatively small bulk and slippery surface thereof.

Also the outer portions of the seeds provide the mucilaginous bulk whereas the inside relatively non-absorbent portion acts as roughage. Although bulk in laxative materials is desirable, roughage is considered quite undesirable because of its irritating qualities.

It is among the objects of the present invention to prepare psyllium and similar seeds and other similar materials giving rise to mucilaginous exudation for laxative or bulk purposes so that they may be readily chewed, so that they will not easily lodge in the teeth and so that they will readily and much more quickly absorb a maximum amount of water and give a much larger mucilaginous exudation and give a much fuller efficiency than usual, and so that they will not tend to lodge or cause irritation in the intestinal tract.

Another object of the present invention is to prepare an improved psyllium seed which will be more readily ingested and which with smaller volume and in smaller amount will give a much higher laxative or bulk effect than previously obtained with the present psyllium seed.

A still further object of the present invention is to prepare an improved psyllium seed in which the relatively non-absorbent interior of the seed may be made substantially softer and more absorbent so as to provide some additional bulk qualities as compared with its usual irritating roughage qualities.

Still further objects and advantages will appear in the more detailed description set forth below, it being understood however that this more detailed description is given by way of illustration and explanation only and not by way of limitation, since various changes therein may be made by those skilled in the art without departing from the scope and spirit of the present invention.

In order to accomplish the above objects it has been found that psyllium seed may readily be converted into a sponge-like or better water absorbable or substantially more separated condition by expanding it under various conditions.

This is most desirably accomplished by placing the psyllium seed in a closed vessel such as an autoclave or in a pressure gun in which apparatus the psyllium may be kept for the required length of time, at the proper temperature and pressure, and with the required moisture content. The pressure gun is then suddenly opened to the lower or atmospheric pressure and the expansion of the psyllium seed takes place.

It has been found usually desirable however to keep the temperature above 200°, and under some conditions this may run as high at 700° or higher. The most preferred temperature range however is between around 250° and 500° F. However, care must be taken not to expose the seeds to these high temperatures for too long a period of time as this will impair the mucilaginous property of the seeds. Where it is desired to provide a high temperature for the expansion of the seeds, the length of time should be materially shortened in many cases to a period of a few seconds although the most desired procedure is to adjust the expanding operation to the lowest heat possible to produce the expansion and softness desired.

The steam may be at any desired pressure that may be found desirable for the purposes required but it has been found usually desirable however to keep the pressure over 15 pounds per square inch and preferably between 20 pounds and 500 pounds per square inch, but most preferably between 40 and 250 pounds per square inch.

During the application of the treatment in the pressure gun some moisture should be present so as to aid in the softening of the fibres and structure of the seeds and so as to enable exploding and expanding of these seeds.

This moisture may be introduced in various ways, as for instance the seed may be immersed in water or it may first be cooked in water, or water may be admitted into the pressure gun before it is closed or the steam or superheated steam may be used to provide the moisture required.

Where the seeds are first cooked or exposed to a water so that they absorb more water than is necessary for proper expanding, then the seeds should be subsequently dried to the required moisture content before placing them into the pressure gun.

It is also possible to expand psyllium and like seeds without having any steam admitted from the outside. This is done by selecting seeds having the required moisture within the seed or by placing the required moisture within the pressure gun and then applying dry heat which in turn builds up a steam pressure within the chamber that will enable the explosion of the seed when the vessel is opened to change the pressure to atmospheric.

The time period for the treatment of the psyllium seed in the gun or autoclave or other closed vessel may vary. The time period may be whatever is required for the desired degree of expansion although it generally has been found that for most purposes the treatment generally may continue from 3 seconds up to around 15 or 18 minutes depending upon the various factors involved as for instance, the general method used, the degree of expansion desired, the equipment used, the degree of heat or the steam pressure, the hardness of the seed and similar other factors.

However, usually the time of treatment ranges between 10 seconds and 4 minutes and most generally between 30 seconds and 2 minutes. The entire treatment should be carefully adjusted so as to get the full expansion desired without any burning.

In some cases it will be found desirable, usually before the psyllium seed is placed in the pressure gun, to subject the psyllium seed to freezing, and particularly to slow freezing so as to disintegrate or break down the fibrous structure of the seeds. After this freezing process it will usually be desirable to dry or dehydrate the seeds to the required moisture content before continuing with the expansion process or with further handling.

The atmospheric conditions to which the seed is subsequently subjected upon the opening of the pressure chamber or gun will largely control the porosity and characteristics of the expanded seed. It is possible to control the expansion, porosity, etc., and to develop variations and new characteristics and qualities in the psyllium seeds of this invention by ejecting them from the pressure chamber into atmospheres having higher or lower pressures than atmospheric or into partial or complete vacuum or into various atmospheres which may contain carbon dioxide, nitrogen or even into various oil or water vapors.

It is desirable at times to provide a double or multiple expansion by first expanding from one pressure to a lower pressure or to atmospheric, and then again expanding one or more times between the same or other pressures and/or temperatures. This multiple expansion may be used not only to control the porosity or to vary the character of the seed or similar material, but it may be used with many seeds or materials in which the mucilaginous qualities might be injured or decreased at high temperatures and pressures. In this procedure, these seeds or materials may be subjected to one or more additional expansions at temperatures ranging for example, between 150° F. and 300° F. and at pressures ranging for example, between 20 pounds and 40 pounds.

It is desirable at times to place a coating on or within the pieces of psyllium seed so as to permit the formation of even harder walls and thereby to result in a greater or more efficient explosion of the product. Starches, resins, gums, and similar materials may be used to provide such a coating. Particularly is this coating of advantage when it is used with psyllium seed that has been exploded one or more times, and it is desirable to harden its walls so as to permit expansion by further explosion.

The psyllium seed treated in accord with this invention will result in the consequent separation or disintegration of the fibre or mass or compacted parts of the seed. It will achieve an expanded bulk which may range from 2 or 3 to 6 times or more greater than its original size, and it will be considerably softened and much more water-absorbable.

After this treatment as above described, the inside portion of the seed which does not produce the mucilaginous material but which usually acts in the system as roughage which is irritating, is now softened and expanded. In this form this inside hull will now increase the water absorbent quality of the entire psyllium seed in view of its new absorbent character that enables it to absorb additional water. Even in acting as roughage it will not be as irritating as heretofore in view of its newly softened character.

This psyllium seed of this invention may be directly ingested into the human system and may be readily chewed and will cause relatively no irritation in the intestines. Moreover the efficiency of the psyllium seeds is substantially enhanced and increased due to the better mucilaginous exudation of the seeds and due to their greater body which is thereby produced in the intestinal tract. This enhanced mucilaginous exudation and increased bulk is due to the fact that the seeds now absorb much more water than the ordinary untreated seeds and will in many cases pick up from 3 to 5 or even more times the amount of water ordinarily taken up by the untreated seeds under the same conditions.

For various purposes, as for instance, to prevent or minimize the sticking together of the seeds or other materials because of the moisture or steam in the pressure vessel, these materials may be ejected into an oily mist or vapor, preferably a warm or hot vapor or mist, or they may be ejected into a bath of oil or fat preferably warm or hot. The oil for the oil mist or for the oil bath may be for instance, castor oil, or olive oil, or mineral oil, or combinations thereof. These materials may also be ejected for various purposes into a dry atmosphere, at warm or hot temperatures which may be at or below the temperature within the pressure vessel.

The expanded psyllium seed which has thus been exposed to oily or fatty mediums may be drained of the excess oil or fat or it may be placed into a warm or hot chamber so as to liquefy the fat further and thereby enable it to drain out to a larger extent.

The expanded seeds also can be more effectively dried if they are shaken so as to break up any clusters and separate the expanded seeds. This may be done before and/or after the exposure to the various drying and separating methods. Also, any combination of the various drying and separating methods may be used in order to accomplish the results that are desired.

Also, the seeds may be cooked or boiled in water or processed with steam or with superheated steam and then dried and subsequently expanded from a pressure gun.

Another method which may be used to produce a very efficient laxative or bulk material from psyllium seed and similar seeds is to first boil the psyllium seed with a sufficient amount of water or other aqueous materials. In order to get more thorough cooking, steam pressure kettles or steam or superheated steam may be used for this cooking process. The cooked material is then cooked or dried so that it is in a plastic or soft condition or it may be cooled or treated with flour, cornstarch, gums, or some other thickener or similar water absorbent. Then it may be put into molds or it may be run through presses such as are used for forming various alimentary pastes.

The formed materials may then be dried either for commercial use in the form of dry cakes or chopped pieces of alimentary-paste-like character. If desired, these cakes or chopped pieces may then be placed into the pressure gun and expanded and treated as above described, whether or not the psyllium has been previously so treated.

The various expanded psyllium products above described may also be prepared in powdered, baked, cooked or other prepared or processed form with or without other materials such as raisins or figs or with other edible materials or with medicinal materials such as senna, etc.

It has also been found highly desirable to put the treated seeds into a medium or carrier which also may have desirable laxative or medicinal qualities. For example, the seeds after they have been expanded may be stirred into a molten or plastic petrolatum jelly or they may be combined with a liquid mineral oil or with a vegetable or animal oil or fat.

The combination of lubricant and psyllium seed which is possible with expanded psyllium because of its absorptive and retentive capacity of such lubricants, is particularly advantageous since it assures more ready passage of the psyllium material through the intestines without clogging. This absorptive property is a substantial advantage over ordinary psyllium seed.

It has been found that such mediums as liquid vegetable oils or liquid mineral oil, but preferably petrolatum jelly or hard vegetable oils or fats as for instance hydrogenated cottonseed oil of 110° F. melting point, may be utilized as a carrier or impregnate of this expanded psyllium seed and will tend to protect the same to a large extent from oxidation and deterioration. This will enable the material to be stored and its quality to be maintained for long periods of time.

In addition to or in place of using a mineral oil or petrolatum jelly or a hard fat or an oil as a binder or impregnating agent, it is also possible to use various kinds of edible gums, waxes and resins such as paraffin, beeswax, stearine, hydrogenated oils, sugars, starches and so forth, some of which materials may have to be applied in molten form or in the form of a solution.

The expanded psyllium seed may also be combined for various purposes with various types of gums and other materials such as gum arabic, dextrine, karaya, starch, tragacanth, pectin, gelatin, agar agar or with other water absorbents.

The materials above mentioned may be used not only to bind together psyllium seeds, or other similar seeds or materials but they may be used to advantage in binding together various types of materials, such as psyllium seed and flaxseed, with or without other flavoring materials, so as to form a unified piece containing the varied properties of the materials bound together.

These expanded seeds by themselves or in the carrier medium may be combined with other medicinal materials such as senna, phenolphthalein, milk of magnesia, castor oil, or with raisins, prunes, figs, or with extracts or syrups thereof, and they may then be made into the form either of cakes or liquids or bricks or molds thereof.

The expanded psyllium seed may be advantageously and effectively added to any number of other foods as for instance, bread, cakes, etc. or it may be most readily combined with chocolate or confectionery and other materials. In these combinations this new expanded psyllium seed can now be readily chewed so as to provide desirable means for introducing laxatives or bulk into the system.

The addition of materials such as melted chocolate or molten sugar or sugar syrup into the pores and crevices of the expanded psyllium seed or as a covering therefor, is particularly helpful since it tends to exclude air from the pores and passages which are formed in the psyllium seed as a result of the expansion thereof and will prevent or retard oxidative deterioration of such psyllium seed or of any similar seed which may be utilized.

The psyllium seed when in its expanded condition may of course be mixed with other materials to be ingested and may be suitably flavored with various types of suitable flavoring materials which flavoring materials may be sprayed thereon or absorbed therein. This may be done by treating the expanded psyllium seed with a water solution and the particular flavoring which is desired or by using various adhesive or binding materials such as those described herein or others. Flavoring materials such as licorice, vanilla, orange, lemon, lime and so forth may be readily applied to or absorbed into the expanded psyllium seed.

Also the expanded seeds, in their plain condition or in the modifications as set forth herein may be powdered. The powdered or pulverized expanded psyllium seed, with or without the modifications described herein, may be made into combinations by mixing with nut butter, as for instance, peanut butter so as to form agreeable bulk and medicinal laxative materials. In combinations with nut butters or other similar oily components, the fat or oil of these components may be partially or wholly removed and replaced with other medicinal oils or combinations thereof such as mineral oil, castor oil, olive oil, etc., or combinations thereof. Less preferably the expanded whole psyllium seed may also be used in combinations with nut butters.

Although the present invention is particularly directed to psyllium seed it is obvious that many other types of similar seeds and similar materials may be similarly treated and processed to likewise enhance their medicinal and laxative properties and their other qualities.

Among the many types of seeds which may be readily treated by the present invention are preferably those from the so-called Psyllium family such as *Plantago psyllium, Plantago lanceolota, P. ovate, P. major, P. ispaghula*, etc. However, in many cases, other seeds which are used medicinally and which contain mucinous or mucilaginous materials may be treated so as to produce expansion and enable water contact with these mucilaginous materials much more readily.

In the event any of these materials contain more moisture than is required for most effective expanding, the material should be dried or dehydrated to proper moisture content of, for instance, 4% to 12%, and then the material may be expanded as above described.

These seeds and similar materials when treated in the manner above set forth so as to have an expanded and increased water absorbable structure have a particularly highly enhanced peristaltic value by reason of the increased volume and bulk of this material in the intestines and digestive tract.

A particular advantage of the present invention resides in the fact that the mucilaginous producing skin or outer portion of the expanded seeds is more exposed and more accessible to the liquids in the intestines because of the interstices and pores which are formed upon expansion. This permits the water to much more readily enter into and between these separated fibres and compacted parts of the seeds. Moreover there is a greater surface provided from which the mucilaginous material may develop. The mucilaginous material produced is also much more permanent with the expanded seeds of the present invention in that the fibres are given more room to expand.

Another advantage of using the expanded psyllium or other seeds as above described is that not only does the mucilaginous exudation arise to a greater degree to provide the desired bulk, but the expanded interior body now also acts to enhance the bulk. This is superior to ordinary psyllium where the only bulk arises from the limited area of the outer shell and where there the interior remains as irritating roughage as compared with the materially softer, more absorbent interior of the new expanded seeds.

Although the procedures above described are preferably applied to psyllium seeds, they may also be applied, although in many cases less preferably, to materials such as seeds from the plants of the Salva family as for instance, *Salvia chia, S. patens, S. polystachia, S. viridis L.*, etc.; also to other materials that are used medicinally, such as seeds from flax (*Linum usitatissimum*), seeds from quince (*Pyrus cydonia*), and such mucilaginous producing materials as okra (*Hibiscus esculentus*); to gums as for instance, arabic, locust bean, karaya, etc.; to agar agar, gelatin, pectin, powdered psyllium, and to other water absorbent and bulk producing materials used for encouraging peristalsis, relieving constipation conditions, etc. Any of these materials may be made from or produced into powdered, divided, pellet, granular, chip, block, baked, etc., form depending upon the original form or the required finished form. These materials, and particularly powdered materials such as gums, gelatin, powdered psyllium, etc., may be used either individually or in various combinations thereof. These may be made into cakes, chips, or other hard pieces before they are expanded and in so doing they may be compacted dry but preferably in slightly dampened form, or they may be cooked and then dried in molds or forms, or after they are dampened, or cooked and sufficiently dried, they may be then pressed through alimentary-paste presses so as to form ribbons, etc., which may then be broken or cut into the desired pieces, etc.

However, for the preferred embodiment of this invention there are used seeds which are of a hard nature, and which normally present difficulty in chewing and which contain a large quantity of mucinous or mucilaginous material.

What is claimed is:

1. An expanded, structure disrupted, medicinal, low starch bulk producing and mucilaginous exuding seed, the interior of which has been expanded to a greater volume than in its original condition, and which interior has been rendered relatively porous and relatively more water absorbent, said expanded seed retaining substantially its unity.

2. An expanded, structure disrupted psyllium seed, the interior of which has been expanded to a greater volume than in its original condition, and which interior has been rendered relatively porous, said expanded seed retaining substantially its unity.

3. An expanded, structure disrupted flax seed, the interior of which has been expanded to a greater volume than in its original condition, and which interior has been rendered relatively porous, said expanded seed retaining substantially its unity.

4. An expanded, structure disrupted quince seed, the interior of which has been expanded to a greater volume than in its original condition, and which interior has been rendered relatively porous, said expanded seed retaining substantially its unity.

ALBERT MUSHER.